United States Patent

Robinson

[11] Patent Number: 5,806,606
[45] Date of Patent: Sep. 15, 1998

[54] HYDRALIC HARROW LIFT

[76] Inventor: Wesley T. Robinson, Box 974, Hanna, Alberta, Canada, T0J 1P0

[21] Appl. No.: 807,601

[22] Filed: Feb. 27, 1997

[51] Int. Cl.⁶ .................................................. A01B 23/00
[52] U.S. Cl. ........................ 172/198; 172/506; 172/662; 172/748
[58] Field of Search ..................... 172/195, 196, 172/198, 197, 200, 452, 506, 482, 478, 662, 744, 748

[56] References Cited

U.S. PATENT DOCUMENTS

| | | |
|---|---|---|
| 3,090,447 | 5/1963 | Hotchkiss, Jr. ............... 172/198 X |
| 3,090,448 | 5/1963 | Hotchkiss, Jr. ............... 172/198 X |
| 4,029,155 | 6/1977 | Blair et al. .................... 172/198 X |
| 4,031,963 | 6/1977 | Poggemiller et al. . |
| 4,057,111 | 11/1977 | Van Der Lely et al. . |
| 4,451,052 | 5/1984 | Gagelin . |
| 4,487,268 | 12/1984 | Greve . |
| 5,168,936 | 12/1992 | Stevens ............................. 172/662 |
| 5,191,942 | 3/1993 | Bussiere . |
| 5,207,279 | 5/1993 | Nelson et al. . |

*Primary Examiner*—Michael J. Carone
*Assistant Examiner*—Christopher J. Novosad

[57] ABSTRACT

A hydraulic harrow lift including a cultivator assembly, a harrow assembly, and a pair of spaced linear harrow arms fixedly coupled at outboard ends thereof to the harrow assembly. The harrow arms further have inboard ends pivotally coupled to the cultivator. Further provided is a hydraulic harrow lift assembly including a hydraulic arm having a first orientation upon the receipt of a raise signal for raising the harrow assembly and a second orientation upon the receipt of a lower signal for lowering the harrow assembly.

6 Claims, 3 Drawing Sheets

FIG 5
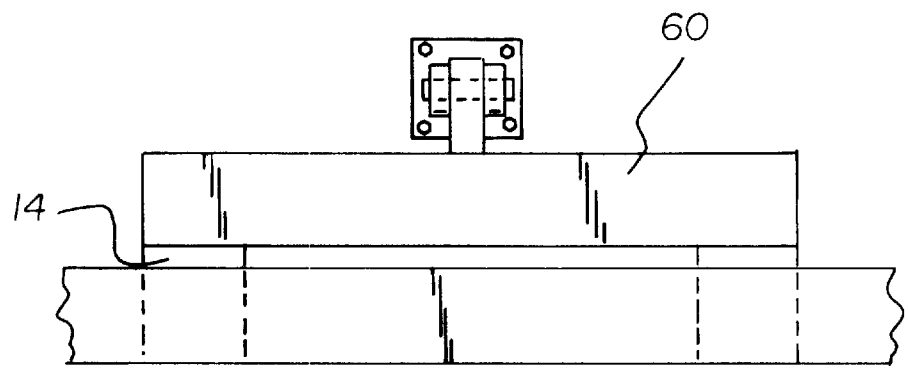
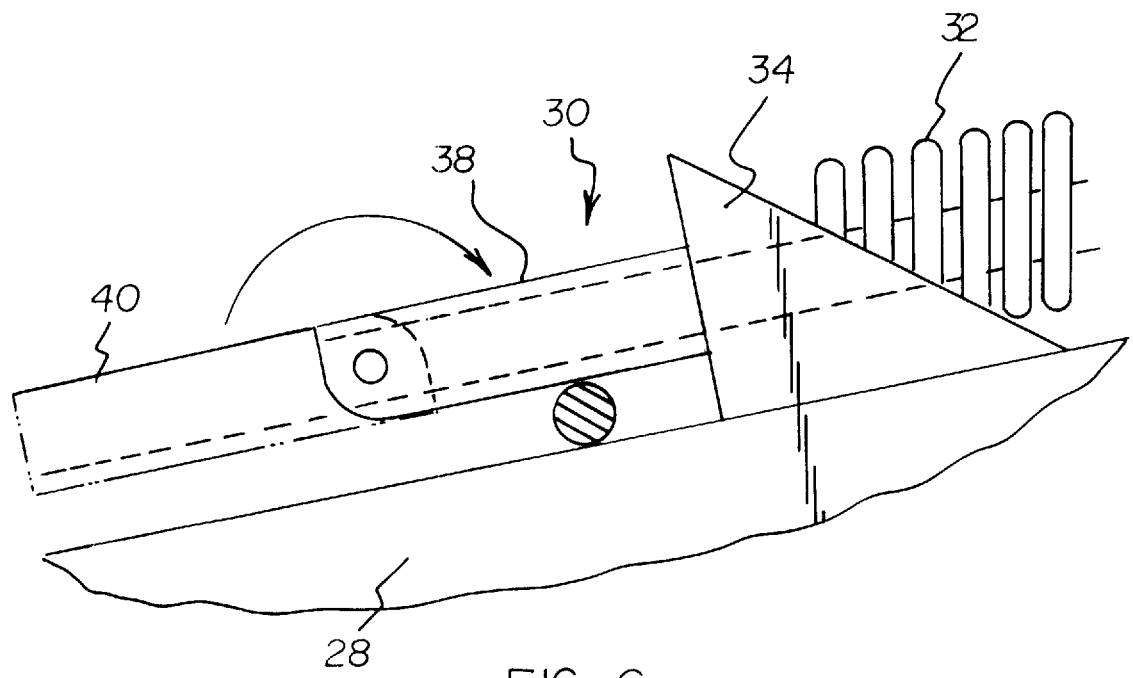
FIG 6

HYDRALIC HARROW LIFT

BACKGROUND OF THE INVENTION

1. Field of the Invention

The present invention relates to a hydraulic harrow lift and more particularly pertains to allowing a user to conveniently lift a harrow across hill tops and selective places where its use is not desired without having to leave an associated tractor.

2. Description of the Prior Art

The use of hydraulic lifts for farming equipment is known in the prior art. More specifically, hydraulic lifts for farming equipment heretofore devised and utilized for the purpose of for lifting various types of tractor powered farm equipment from a cab of a tractor are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,191,942 to Busseire; U.S. Pat. No. 5,207,279 to Nelson et al.; U.S. Pat. No. 4,451,052 to Gagelin; U.S. Pat. No. 4,487,268 to Greve; U.S. Pat. No. 4,057,111 to Van der Lely et al.; and U.S. Pat. No. 4,031,963 to Poggemiller et al.

In this respect, the hydraulic harrow lift according to the present invention substantially departs from the conventional concepts and designs of the prior art, and in so doing provides an apparatus primarily developed for the purpose of allowing a user to conveniently lift a harrow across hill tops and selective places where its use is not desired without having to leave an associated tractor.

Therefore, it can be appreciated that there exists a continuing need for a new and improved hydraulic harrow lift which can be used for allowing a user to conveniently lift a harrow across hill tops and selective places where its use is not desired without having to leave an associated tractor. In this regard, the present invention substantially fulfills this need.

SUMMARY OF THE INVENTION

In view of the foregoing disadvantages inherent in the known types of hydraulic lifts for farming equipment now present in the prior art, the present invention provides an improved hydraulic harrow lift. As such, the general purpose of the present invention, which will be described subsequently in greater detail, is to provide a new and improved hydraulic harrow lift which has all the advantages of the prior art and none of the disadvantages.

To attain this, the present invention essentially comprises a cultivator assembly with a plurality of horizontally oriented longitudinal supports. As shown in FIG. 1, a plurality of arcuate prongs are coupled at a top end thereof to the supports and depend therefrom for cultivating earth. As best shown in FIGS. 1–2, a harrow assembly is included with a plurality of secondary horizontally oriented lateral supports. Each secondary lateral support has a plurality of spring biased teeth depending therefrom. The lateral supports are configured in a plurality of rows. A pair of longitudinal supports traverse the lateral supports and are further fixedly coupled thereto for maintaining the relative position of the secondary lateral supports. Coupled between the longitudinal supports is a primary lateral support. Further provided is a pair of spaced linear harrow arms. Such arms are fixedly coupled at outboard ends thereof to opposite ends of the primary lateral support of the harrow assembly. The harrow arms further have inboard ends pivotally coupled to an outboard end of an associated longitudinal support of the cultivator. As best shown in FIG. 6, a manual harrow arm locking mechanism is included with a spring positioned on a top face of each of the harrow arms. The spring is positioned between a first spring stopper centrally situated on the top face of the harrow arms and a second spring stopper positioned on the cultivator. A rod is positioned coaxially within the spring with a first end thereof abutting the second stopper and a second end thereof extending through an aperture formed in the first stopper. By this structure, the rod is extended further beyond the first stopper as a function of the height to which the harrow assembly is raised. A locking pivot is pivotally coupled to the second end of the rod with two positions. An unlocked position is defined by the locking pivot residing in coaxial relationship with the rod. A locked position is defined by the locking pivot being rotated against the rod thereby abutting the first stopper for maintaining the harrow assembly in an elevated orientation. With reference to FIGS. 3–5, a hydraulic harrow lift assembly is included with a plurality of components. As shown in FIGS. 3 & 4, a pair of pivot brackets are each fixedly coupled to a central extent of a corresponding harrow arm. Each pivot bracket includes a square plate with a tubular sleeve integrally coupled to a central extent thereof. A U-shaped member is adapted to secure the square plates to the associated harrow arm thereof such that the tubular sleeves thereof are facing each other and are in coaxial relationship with respect to each other. Yet another component of the hydraulic harrow lift assembly is a pivot arm. The pivot arm includes a cylinder with ends thereof rotatably situated within the tubular sleeves of the pivot brackets. The pivot arm further has an extension fixedly coupled at a first end thereof to a central extent of the cylinder and extended upwardly therefrom. A chain is coupled between a second end of the extension of the pivot arm and a central extent of the primary lateral support of the harrow assembly. As best shown in FIG. 5, a cross bar is coupled between the outboard ends of the longitudinal supports of the cultivator. Finally, a hydraulic arm is rotatably coupled at a first end thereof to a central extent of the cross bar. A second end of the hydraulic arm is rotatably coupled to the second end of the extension of the pivot arm.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hydraulic harrow lift which has all the advantages of the prior art hydraulic lifts for farming equipment and none of the disadvantages.

It is another object of the present invention to provide a new and improved hydraulic harrow lift which may be easily and efficiently manufactured and marketed.

It is a further object of the present invention to provide a new and improved hydraulic harrow lift which is of a durable and reliable construction.

An even further object of the present invention is to provide a new and improved hydraulic harrow lift which is susceptible of a low cost of manufacture with regard to both materials and labor, and which accordingly is then susceptible of low prices of sale to the consuming public, thereby making such hydraulic harrow lift economically available to the buying public.

Still yet another object of the present invention is to provide a new and improved hydraulic harrow lift which provides in the apparatuses and methods of the prior art some of the advantages thereof, while simultaneously overcoming some of the disadvantages normally associated therewith.

Still another object of the present invention is to allow a user to conveniently lift a harrow across hill tops and selective places where it is not desired without having to leave an associated tractor.

Lastly, it is an object of the present invention to provide a new and improved hydraulic harrow lift including a cultivator assembly, a harrow assembly, and a pair of spaced linear harrow arms fixedly coupled at outboard ends thereof to the harrow assembly. The harrow arms further have inboard ends pivotally coupled to the cultivator. Further provided is a hydraulic harrow lift assembly including a hydraulic arm having a first orientation upon the receipt of a raise signal for raising the harrow assembly and a second orientation upon the receipt of a lower signal for lowering the harrow assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the present taken along line 5—5 shown in FIG. 1.

FIG. 6 is an enlarged view of section 6 encircled in FIG. 1.

Similar reference characters refer to similar parts throughout the several views of the drawings.

DESCRIPTION OF THE PREFERRED EMBODIMENT

Figure 1:
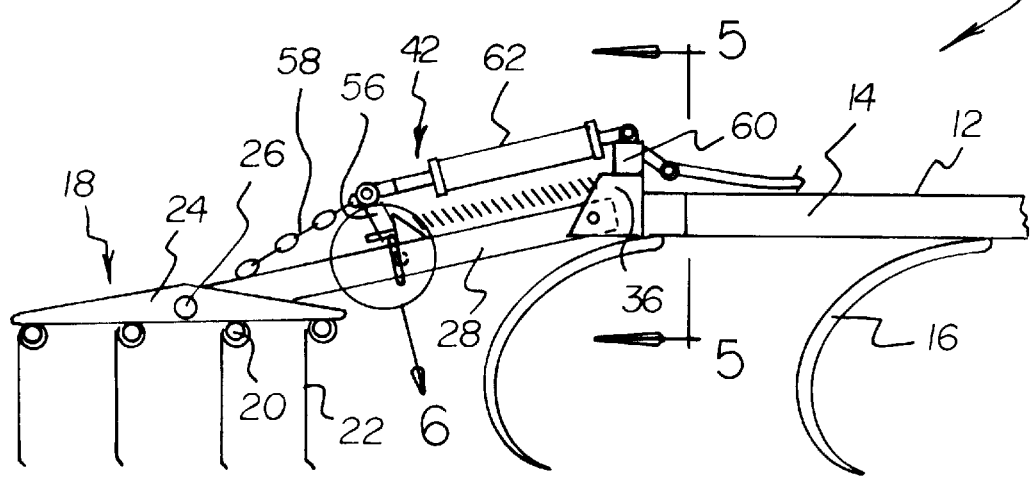
FIG. 1 is a perspective illustration of the preferred embodiment of the hydraulic harrow lift constructed in accordance with the principles of the present invention.

With reference now to the drawings, and in particular to FIG. 1 thereof, a new and improved hydraulic harrow lift embodying the principles and concepts of the present invention and generally designated by the reference numeral 10 will be described.

The present invention, the new and improved hydraulic harrow lift, is comprised of a plurality of components. Such components in their broadest context include a cultivator assembly, harrow assembly, harrow arm, and hydraulic harrow assembly. Such components are individually configured and correlated with respect to each other so as to attain the desired objective.

More specifically, it will be noted that the system 10 of the present invention includes a cultivator assembly 12 with a plurality of horizontally oriented longitudinal supports 14. As shown in FIG. 1, a plurality of arcuate prongs 16 are coupled at a top end thereof to the supports and depend therefrom for cultivating earth.

Figure 2:
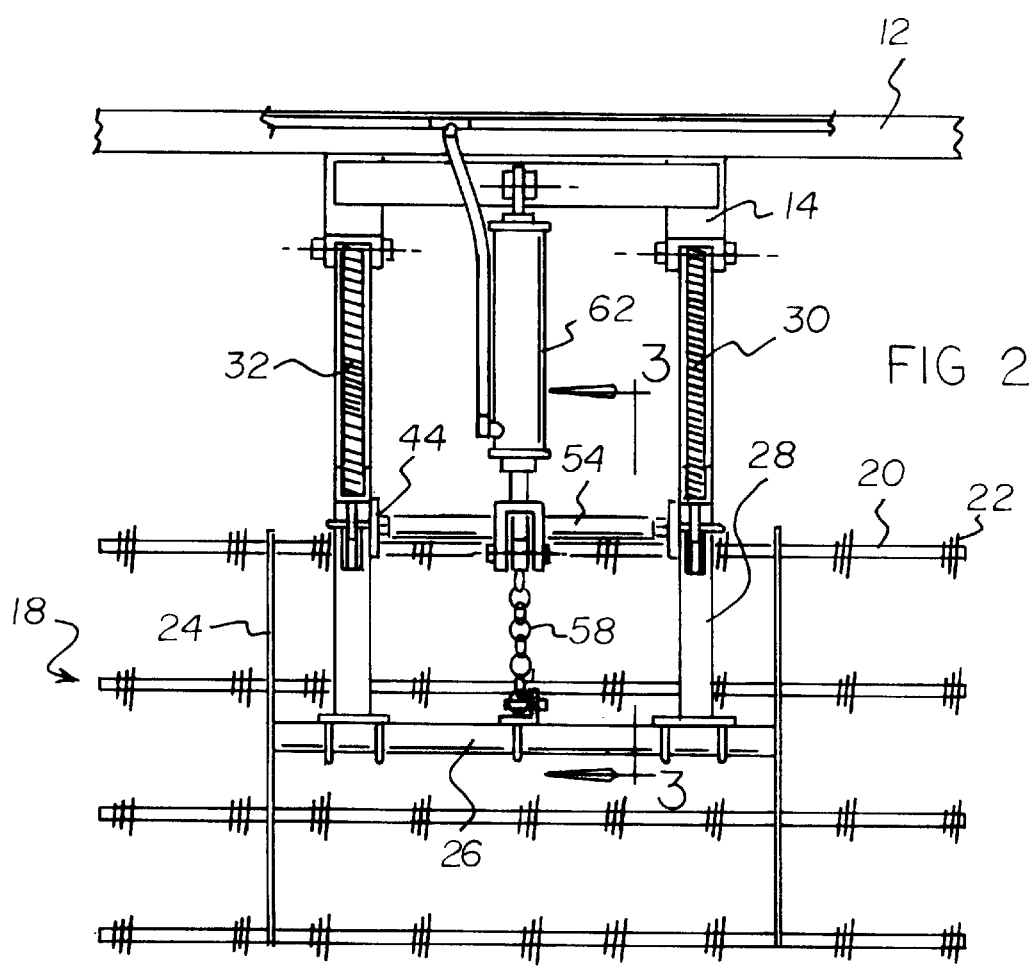
FIG. 2 is a top plan view of the present invention.

As best shown in FIGS. 1–2, a harrow assembly 18 is included with a plurality of secondary horizontally oriented lateral supports 20. Each secondary lateral support has a plurality of spring biased teeth 22 depending therefrom. The lateral supports are configured in a plurality of rows. A pair of longitudinal supports 24 traverse the lateral supports and are further fixedly coupled thereto for maintaining the relative position of the secondary lateral supports. Coupled between the longitudinal supports is a primary lateral support 26.

Further provided is a pair of spaced linear harrow arms 28. Such arms are fixedly coupled at outboard ends thereof to opposite ends of the primary lateral support 26 of the harrow assembly. The harrow arms further have inboard ends pivotally coupled to an outboard end of an associated longitudinal support of the cultivator.

As best shown in FIG. 6, a manual harrow arm locking mechanism 30 is included with a spring 32 positioned on a top face of each of the harrow arms. The spring is positioned between a first spring stopper 34 centrally situated on the top face of the harrow arms and a second spring stopper 36 positioned on the cultivator. A rod 38 is positioned coaxially within the spring with a first end thereof abutting the second stopper and a second end thereof extending through an aperture formed in the first stopper. By this structure, the rod is extended further beyond the first stopper as a function of the height to which the harrow assembly is raised. A locking pivot 40 is pivotally coupled to the second end of the rod with two positions. An unlocked position is defined by the locking pivot residing in coaxial relationship with the rod. A locked position is defined by the locking pivot being rotated against the rod thereby abutting the first stopper for maintaining the harrow assembly in an elevated orientation.

Figure 3:
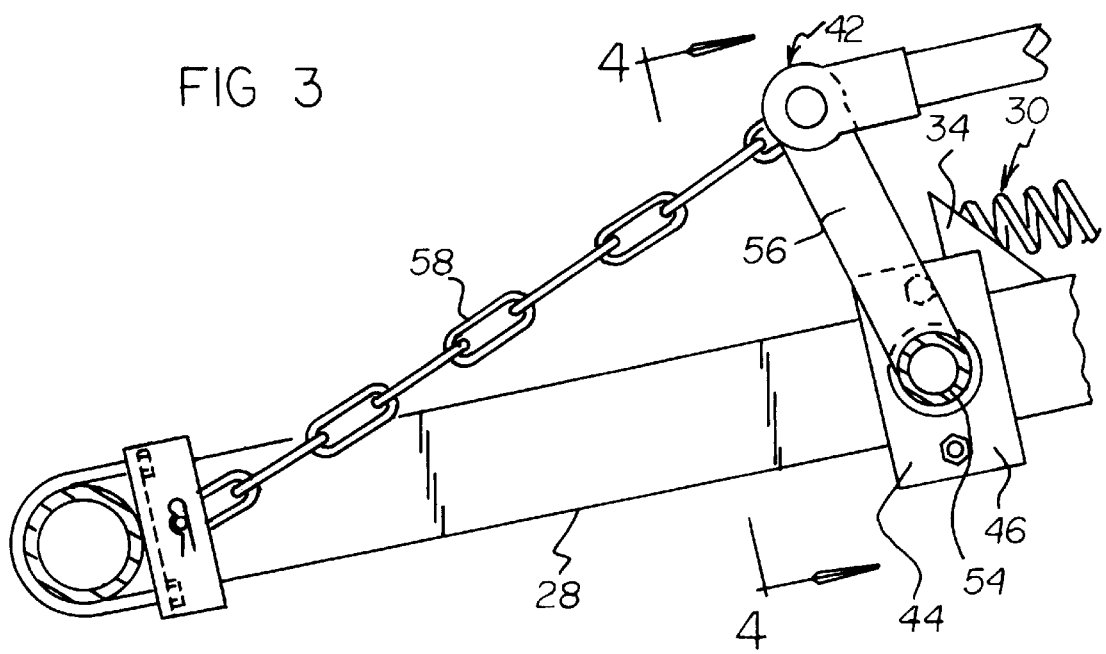
FIG. 3 is a cross-sectional view of the present taken along line 3—3 shown in FIG. 2.
Figure 4:
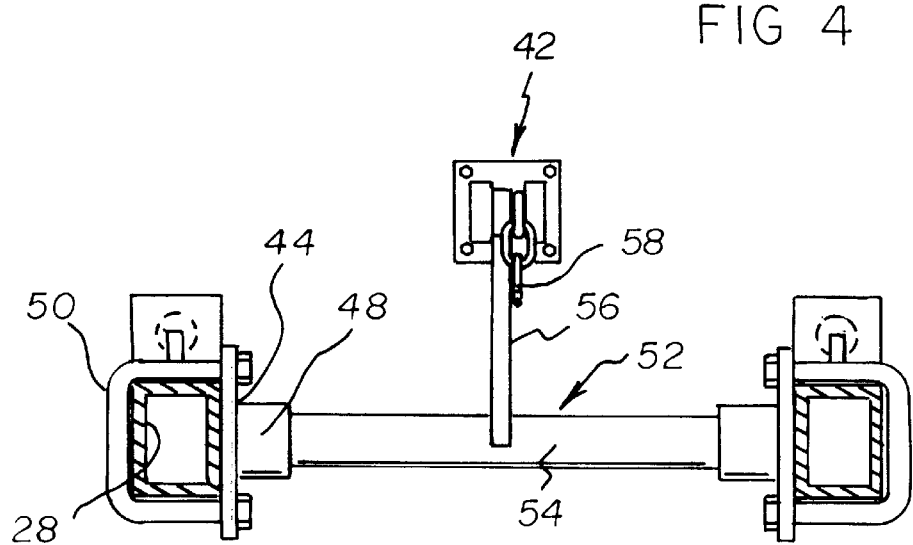
FIG. 4 is a cross-sectional view of the present taken along line 4—4 shown in FIG. 3.

With reference to FIGS. 3–5, a hydraulic harrow lift assembly 42 is included with a plurality of components. As shown in FIGS. 3 & 4, a pair of pivot brackets 44 are each fixedly coupled to a central extent of a corresponding harrow arm. Each pivot bracket includes a square plate 46 with a tubular sleeve 48 integrally coupled to a central extent thereof. A U-shaped member 50 is adapted to secure the square plates to the associated harrow arm thereof such that the tubular sleeves thereof are facing each other and are in coaxial relationship with respect to each other.

Yet another component of the hydraulic harrow lift assembly is a pivot arm 52. The pivot arm includes a cylinder 54 with ends thereof rotatably situated within the tubular sleeves of the pivot brackets. The pivot arm further has an extension 56 fixedly coupled at a first end thereof to a central extent of the cylinder. In use, the extension extends upwardly from the cylinder. Ideally, the extension is at least 6 inches in length.

A chain 58 is coupled between a second end of the extension of the pivot arm and a central extent of the primary lateral support of the harrow assembly. The coupling of the chain to the primary lateral support is ideally accomplished with an assembly 59 similar to the pivot bracket except that the tubular sleeve is excluded in favor of a coupling pin for securement with the chain.

As best shown in FIG. 5, a cross bar 60 is coupled between the outboard ends of the longitudinal supports of the cultivator. It should be noted that the distance between the longitudinal supports of the cultivator may very hence requiring the cross bar to be designed to fully traverse such distance.

Finally, a hydraulic arm 62 is rotatably coupled at a first end thereof to a central extent of the cross bar. A second end of the hydraulic arm is rotatably coupled to the second end of the extension of the pivot arm.

In use, the hydraulic arm has a retracted orientation upon the receipt of a raise signal for raising the harrow assembly. Upon the receipt of a lower signal, the hydraulic arm has a extended orientation for lowering the harrow assembly. It should be noted that such signals are preferably in form of hydraulic pressure changes which are controlled from a cab of a tractor. Also, while the current components provide a device which may easily be installed to any existing cultivator and harrow, such components may be installed at the time of manufacture. If desired a user may rotate the locking pivot against the associated rod for maintaining the harrow assembly in an elevated orientation without the aid of hydraulics.

In the present description and figures, only one harrow assembly is shown and described. It is imperative to note however that a conventional cultivator may have numerous harrow assemblies each conforming to the foregoing description and further controlled from the cab of the tractor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hydraulic harrow lift comprising, in combination:
   a cultivator assembly with a plurality of horizontally oriented longitudinal supports and a plurality of arcuate prongs coupled at a top end thereof to the supports and depending therefrom for cultivating earth;
   a harrow assembly with a plurality of secondary horizontally oriented lateral supports each having a plurality of spring biased teeth depending therefrom with the lateral supports configured in a plurality of rows, a pair of longitudinal supports traversing the lateral supports and further fixedly coupled thereto for maintaining the relative position of the secondary lateral supports, and a primary lateral support coupled between the longitudinal supports;
   a pair of spaced linear harrow arms fixedly coupled at outboard ends thereof to opposite ends of the primary lateral support of the harrow assembly, the harrow arms further having inboard ends pivotally coupled to an outboard end of an associated longitudinal support of the cultivator;
   a manual harrow arm locking mechanism including a spring positioned on a top face of each of the harrow arms between a first spring stopper centrally situated on the top face of the harrow arms and a second spring stopper positioned on the cultivator, a rod positioned coaxially within the spring with a first end thereof abutting the second stopper and a second end thereof extending through an aperture formed in the first stopper wherein the rod extends further beyond the first stopper as the harrow assembly is raised, a locking pivot pivotally coupled to the second end of the rod with an unlocked position wherein the locking pivot resides in coaxial relationship with the rod and a locked position with the rod adapted to abut the first stopper thereby maintaining the harrow assembly in an elevated orientation; and
   a hydraulic harrow lift assembly comprising:
      a pair of pivot brackets each fixedly coupled to a central extent of a corresponding harrow arm, each pivot bracket including a square plate with a tubular sleeve integrally coupled to a central extent thereof and a U-shaped member adapted to secure the square plates to the associated harrow arms thereof such that the tubular sleeves thereof are facing each other and are in coaxial relationship with respect to each other,
      a pivot arm including a cylinder with ends thereof rotatably situated within the tubular sleeves of the pivot brackets, the pivot arm further having an extension fixedly coupled at a first end thereof to a central extent of the cylinder and extending upwardly therefrom,
      a chain coupled between a second end of the extension of the pivot arm and a central extent of the primary lateral support of the harrow assembly,
      a cross bar coupled between the outboard ends of the longitudinal supports, and
      a hydraulic arm rotatably coupled at a first end thereof to a central extent of the cross bar and at a second end thereof to the second end of the extension of the pivot arm,
      whereby the hydraulic arm has a retracted orientation upon the receipt of a raise signal for raising the harrow assembly and a extended orientation upon the receipt of a lower signal for lowering the harrow assembly.

2. A hydraulic harrow lift comprising:
   a cultivator;
   a harrow assembly;
   a pair of spaced linear harrow arms fixedly coupled at outboard ends thereof to the harrow assembly, the harrow arms further having inboard ends pivotally coupled to the cultivator; and a hydraulic harrow lift assembly including a hydraulic arm having a first orientation upon the receipt of a raise signal for raising the harrow assembly and a second orientation upon the receipt of a lower signal for lowering the harrow assembly;

wherein the harrow lift assembly further includes a pair of pivot brackets each fixedly coupled to a central extent of a corresponding harrow arm, each pivot bracket including a square plate with a tubular sleeve integrally coupled to a central extent thereof and a U-shaped member adapted to secure the square plates to the associated harrow arms thereof such that the tubular sleeves thereof are facing each other and are in coaxial relationship with respect to each other.

3. A hydraulic harrow lift as set forth in claim 2 wherein the harrow lift assembly further includes a pivot arm including a cylinder with ends thereof rotatably situated within the tubular sleeves of the pivot brackets, the pivot arm further having an extension fixedly coupled at a first end thereof to a central extent of the cylinder and extending upwardly therefrom.

4. A hydraulic harrow lift as set forth in claim 3 wherein the harrow lift assembly further includes a chain coupled between a second end of the extension of the pivot arm and the harrow assembly.

5. A hydraulic harrow lift as set forth in claim 4 wherein the harrow lift assembly further includes a cross bar coupled between the outboard ends of a plurality of longitudinal supports of the cultivator.

6. A hydraulic harrow lift comprising:

a cultivator;

a harrow assembly;

a pair of spaced linear harrow arms fixedly coupled at outboard ends thereof to the harrow assembly, the harrow arms further having inboard ends pivotally coupled to the cultivator;

a hydraulic harrow lift assembly including a hydraulic arm having a first orientation upon the receipt of a raise signal for raising the harrow assembly and a second orientation upon the receipt of a lower signal for lowering the harrow assembly; and a manual harrow arm locking mechanism including a spring positioned on a top face of each of the harrow arms between a first spring stopper centrally situated on the top face of the harrow arms and a second spring stopper positioned on the cultivator, a rod positioned coaxially within the spring with a first end thereof abutting the second stopper and a second end thereof extending through an aperture formed in the first stopper wherein the rod extends further beyond the first stopper as the harrow assembly is raised, a locking pivot pivotally coupled to the second end of the rod with an unlocked position wherein the locking pivot resides in coaxial relationship with the rod and a locked position with the rod adapted to abut the first stopper thereby maintaining the harrow assembly in an elevated orientation.

* * * * *